April 23, 1935. G. D. KINGSLAND 1,999,053
PROPORTIONAL CONTROL
Filed July 20, 1931
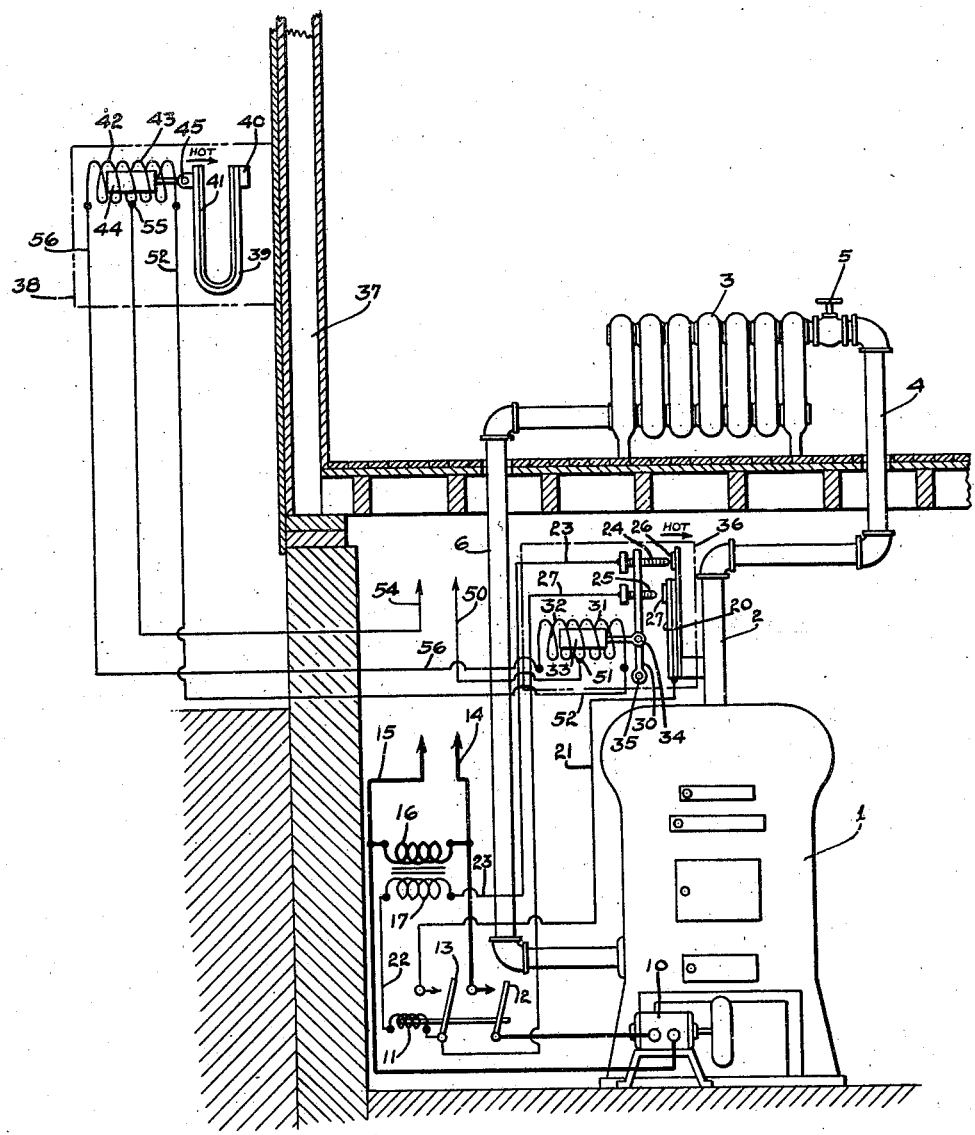
INVENTOR
GEORGE D. KINGSLAND
By *Paul Reuth Moore*
ATTORNEYS Patented Apr. 23, 1935

1,999,053

UNITED STATES PATENT OFFICE 1,999,053

PROPORTIONAL CONTROL

George D. Kingsland, Minneapolis, Minn., assignor to Minneapolis-Honeywell Regulator Company, Minneapolis, Minn., a corporation of Delaware Application July 20, 1931, Serial No. 551,971

17 Claims. (Cl. 236—91)

This invention relates to improvements in controls for devices which are capable of being adjustably calibrated and to the calibration control of such devices, as well as to such control in relation to heating systems. Among the objects are, to obtain a graduated proportioning control of the calibrating means of a thermostatic switch, conformably to temperature changes in the region of the switch and/or at a point remote therefrom.

Important features of the invention include the use of the inductance bridge principle for obtaining graduated proportionate control of the calibrating means; the application of the inductance bridge principle for controlling the heat supply for a space to be heated in accordance with temperature fluctuations of the space, and/or in accordance with fluctuations in temperatures outside the space; to the calibration of a thermostatic switch in accordance with temperature fluctuations of the heating medium and/or in accordance with fluctuations in outside temperature; and to the specific means shown and described for accomplishing the purposes mentioned.

Objects, features and advantages of the invention will be set forth in the description of the drawing forming a part of this application, and in said drawing a single figure discloses one embodiment of the invention, as applied to the graduating proportioning control of a heating system.

In the drawing, the numeral 1 indicates the boiler of a heating system which is symbolic in part of means for circulating a heating medium. Numeral 2 indicates a riser which is suitably connected to a radiator 3 by means of piping 4. The radiator hand valve is indicated at 5. The radiator or return pipe is indicated at 6. A burner motor is indicated at 10, and its operation for controlling production of heat is controlled by means including a relay, of which the coil is indicated at 11. This relay controls two switches respectively indicated at 12 and 13. The switch 12 is in a high voltage motor line of the motor. The motor supply lines are respectively indicated at 14—15. These lines also supply current to a transformer, the primary of which is indicated at 16 and the secondary at 17.

The bimetallic thermal element of the switch is indicated at 20 and is somewhat diagrammatically shown. This element is herein responsive to temperatures in the riser 2, but might be located at the radiator 3, or in any other suitable place. One terminal of this thermal element (or both contacts 26—27 controlled by it) is connected by conductor 21 with the contact of switch 13, and through switch 13 with the coil 11. The other side of the relay coil is connected by conductor 22 with one side of the secondary 17 and the opposite side of the secondary 17 is connected by conductor 23 with contact 24 of the thermal switch. The other switch contact 25 is connected by conductor 27 with the pivot of the movable element of switch 13 and with one terminal of coil 11. The thermal element 20 controls the two contacts 26—27 which are respectively cooperable with the contacts 24—25. During cooling motion of the thermal element 20 and its motion in this instance to the left, 26 first makes with 24 and then 27 makes with 25. As soon as the last mentioned contacts are closed, the coil 11 is energized and the switches 12 and 13 are closed. A holding circuit for the relay coil 11 is established through contacts 24—26 and switch 13. It will be understood that on closure of 12, an ignition cycle takes place, fuel is supplied and combustion ordinarily ensues. Inasmuch as the ignition mechanism forms no part of the present invention, it has not been shown, nor described in detail.

An important feature of this invention relates to the calibration of the thermostatic switch and to the proportional control of this calibration by an inductance bridge, in accordance with fluctuations in outside temperature. This bridge includes two solenoids with electrical connections by which variations in outside temperature effect inductance variations in one solenoid which are electrically transmitted to the other, by which reversing or other motions of the plungers associated with the solenoids can be obtained to cause corresponding motions of the calibrating means. In this instance, this calibration is accomplished by moving the contacts 24—25 toward or away from the corresponding contacts 26—27, controlled by the thermal element 20 to accelerate or delay closure of the contacts and correspondingly proportionately increase or decrease the amount of supplied heat.

The thermostatic switch represents one of a class of instruments which is responsive to variations in physical conditions, and which is so constructed that it can be calibrated conformably to varying conditions of use. As somewhat diagrammatically represented in the drawing, the contacts of the thermostatic switch are mounted on a support which is adapted to be moved toward and away from corresponding contacts controlled by a thermal element.

The solenoid which controls the support 30 for the contacts 24 and 25 is formed of two coils, respectively indicated at 31—32. A plunger 33 is operable by these coils and is pivotally connected as at 34 to the support 30, which support is in turn pivoted as at 35 to a suitable member, not shown. The dot-and-dash lines 36 indicate a casing within which the thermostatic switch and its controlling solenoid are mounted.

The wall of the building is indicated at 37 and attached preferably to this wall at the outside is a casing indicated by dot-and-dash lines at 38. Within this casing is a bimetallic thermal element 39, in this instance having a U-shaped configuration and being supported by one end as at 40 and having the other end or portion 41 free to move conformably to changes in outside temperature. The solenoid which is controlled by this outside thermostatic element has two coils respectively indicated 42—43 and has a plunger 44 pivotally connected as at 45 to the free arm 41 of bimetallic element 39. Electrical connections are provided which are adapted to operate the pairs of solenoid coils on the inductance bridge principle. One side of the supply line for the solenoids is indicated at 50. This supply line has a center tap connection as at 51 with the coils 31 and 32. The opposite end of coil 31 is connected by conductor 52 with one end of coil 43. Supply line 54 has a center tap connection as at 55 with coils 42 and 43. The opposite end of coil 42 is connected by conductor 56 with the end of coil 32. The power connections for the solenoids may be made so that the plungers simultaneously move either in the same or in opposite directions.

When the plunger 44 is moved in the coils 42—43 by means of the element 41 as a result of change in outside temperature, the plunger 33 is correspondingly moved, and through plunger 33 the support 30 is moved in the appropriate direction to correspondingly change the spacing between the contacts 24—25 and the contacts 26—27 controlled by thermal element 20.

*Operation*

Suppose the thermostat 20 is designed or adjusted to cause switch closure at 70 degrees, and that the support 30 is maintained at a position at which this closure will take place at the temperature mentioned, when the outside temperature is, for example, fifty degrees. Under these conditions, on closure of contacts 24—26, 25—27, relay coil 11 will be energized and switches 12 and 13 closed. On closure of 12, combustion will ensue and heat will be supplied in the quantity needed. When the temperature rises sufficiently in the system, the contacts 25—27 will be first broken, and afterwards holding contacts 24—26 will open, which will result in de-energization of coil 11 and opening of switch 12 to stop heat production.

Now suppose a drop in outside temperature to some temperature below fifty degrees. The element 41 will move to the left moving the plunger 44 toward the coil 42 and away from the coil 43. This will result in moving plunger 33 to the right. The circuit is as follows: conductor 54, to connection 55, coil 43, conductor 52, coil 31, tap connection 51 to conductor 50. Motion of plunger 33 to the right, brings contacts 24—25 proportionately nearer to contacts 26—27 so that less cooling of the element 20 will be necessary to obtain closure. This will result in a proportionately greater supply of heat. Conversely, if, under the same conditions, there is an outdoor temperature rise, the element 41 will move to the right, moving the plunger 44 away from coil 42 and toward coil 43 which will result in energization of coil 32 through the following circuit: 54, center tap connection 55, coil 42, 56, 32, 51 to 50. The support 30 will now move to the left and contacts 24—25 will be moved farther away from contacts 26—27, so that a greater cooling of element 20 will be necessary to close them and, therefore, the amount of heat supply will be proportionately decreased.

It will be noted that the control by the use of the inductance bridge is a graduated proportionate control. The action is even, smooth and accurate. Any motion ratio between the plunger 44 and plunger 33 can be obtained.

The use of an inductance bridge in the manner mentioned provides means for converting, transposing, and translating the minute, substantially forceless motions of a thermostat or other sensitive device, in a manner to correspondingly, but forcefully, control an adjacent or a distant mechanism. The device may be considered a power and motion-amplifying means.

In the present device, the mechanical force of the thermal element 41 moves the plunger 44 to effect a variation of inductance, which variation is electrically transmitted to the other solenoid to effect a forceful motion of plunger 33 to correspondingly adjust or change the calibration of the thermostatic switch, in this instance to move the switch contacts relatively to the thermal element, the position of which thermal element is determined by the temperature conditions at point of control.

I claim as my invention:

1. In combination an inductance bridge, a device responsive to physical changes and adapted to effect inductance variation in the bridge conformably to those changes, a switch device and means for operating it conformably to changes in physical conditions other than those of the first device, said switch device having adjusting means, which means is adapted to be adjustably controlled as the result of said inductance variation.

2. In a heating system control, a heat supply means, a thermal switch controlled by the temperature of said heat supply means for initiating heat generation as the result of switch closure, said thermal switch having adjusting means a thermal element exposed to temperatures other than the heat supply means, and an inductance bridge controlled by said thermal element and adapted to control said adjusting means to delay switch closure as the said other temperature rises and to accelerate switch closure as the said other temperature falls.

3. In a heating system control, a heat supply means, a thermal switch controlled by the temperature of said heat supply means and arranged to cause generation of heat when in one position, said switch having adjusting means, a thermal element exposed to temperature other than that of the heat supply means, and an inductance bridge controlled by the last mentioned thermal element and adapted to control the adjusting means of said thermal switch to proportionately increase the heat supply as the said other temperature falls and to proportionately decrease said heat supply as the said other temperature rises.

4. An indoor heating system employing a circulating fluid as a medium, and means for controlling the heat supply to the system, a thermostatic switch responsive to temperature fluctuations of the medium and having means for adjusting its setting, a thermostat responsive to outdoor temperatures, and means including an inductance bridge adapted to control said setting adjusting means to delay switch closure as the outside temperature rises, to accelerate switch closure as the outside temperature falls.

5. In combination two solenoids each having a plunger, electrical connections for the solenoids by which motion of one plunger effects inductance variations in one solenoid, which is electrically transmitted to the other, a temperature responsive device adapted to move one of the plungers, a support having switch contacts thereon and adjustably movable by the other plunger, and a thermal element with reference to which said support is adjustable to increase or decrease the distance between the contacts and said thermal element.

6. An indoor heating system including means for generating heat supply, and means for controlling said generating means including a switch, thermal means responsive to outdoor temperature, means for thermally controlling the switch, said means being responsive to temperatures approximately that of the generating means, and electrical means controlled by the outdoor thermal means and adapted to control the switch, to proportionately and gradually delay switch closure as the outside temperature rises, and to proportionately and gradually accelerate switch closure as the outside temperature falls, said electrical means including a pair of interconnected solenoids.

7. In combination two solenoids each having a plunger, electrical connections for the solenoids by which motion of one plunger effects inductance variation in one solenoid which is electrically transmitted to the other, a temperature responsive device adapted to move one of the plungers, and a thermal switch having adjusting means which is adapted to be adjustably controlled by the other plunger.

8. In combination two solenoids each having a plunger, electrical connections for the solenoids by which motion of one plunger effects inductance variation in one solenoid which is electrically transmitted to the other and by which reversing motions of the plungers can be obtained, a temperature responsive device adapted to move one of the plungers, and a thermal switch having adjusting means which is adapted to be adjustably controlled by the other plunger.

9. In combination, a thermal switch and adjusting means therefor, a plunger controlling said adjusting means, a pair of oppositely acting solenoid coils for positioning said plunger, a temperature responsive device and electrical apparatus controlled thereby for variably energizing said solenoid coils to position the plunger in accordance with the temperature to which the temperature responsive device is subjected.

10. In a heating system control device, heat supply means, a thermal switch controlled by the temperature of said heat supply means for initiating heat generation as the result of switch closure and having adjusting means, a thermal element exposed to temperatures other than the heat supply means, and electrical means controlled by the last mentioned element and steplessly changing said adjusting means to smoothly and increasingly delay switch closure as the temperature of said last mentioned element rises, and to smoothly and increasingly accelerate switch closure as that temperature falls.

11. In a heating system control device, heat supply means, a thermal switch controlled by the temperature of said heat supply means for initiating heat generation as the result of switch closure and having adjusting means, a thermal element exposed to temperatures other than the heat supply means, and electrical proportioning means controlled by the last mentioned element and steplessly changing said adjusting means to smoothly and increasingly delay switch closure as the temperature of said last mentioned element rises, and to smoothly and increasingly accelerate switch closure as that temperature falls.

12. In regulating means for a heating apparatus, the combination of first and second instruments responsive respectively to outside temperature and to the condition of the heating apparatus, the second instrument including thermally controlled contacts which electrically control the heating apparatus, and having adjusting means for the contacts, and electrical means between the first instrument and said adjusting means for steplessly changing the adjusting means to smoothly and uniformly proportion boiler temperature in accordance with outside temperature.

13. In a heating system control device, heat supply means, a thermal switch controlled by the temperature of said heat supply means for controlling the generation of heat and having adjusting means, a thermal element exposed to temperatures other than the heat supply means, and electrical connections controlled by the last mentioned element and steplessly changing said adjusting means to proportionally and smoothly adjust said means to increasingly delay or accelerate switch closure, conformably to changing temperatures.

14. In a heating system control device, heat supply means, a thermal switch controlled by the temperature of said heat supply means for controlling the generation of heat and having adjusting means, a thermal element exposed to temperatures other than the heat supply means, and electrical connections controlled by the last mentioned element and steplessly changing said adjusting means to proportionally and smoothly adjust said means to increasingly delay switch closure as the temperature of said last mentioned element rises and to increasingly accelerate switch closure as that temperature falls.

15. In a heating system control device heat supply means, a thermal switch controlled by the temperature of the heat supply means for initiating heat generation as a result of switch closure and having means movable smoothly and uniformly for obtaining adjustment to gradually delay or hasten its closure, a thermal element exposed to the temperature other than the heating supply means, and electrical means controlled by the last mentioned means and steplessly changing said adjusting means.

16. In a heating system control device heat supply means, a thermal switch controlled by the temperature of the heat supply means for initiating heat generation as a result of switch closure, and having means movable for smoothly and uniformly obtaining adjustment to gradually delay or hasten its closure, a thermal element exposed to the temperature other than the heating supply means, and electrical means controlled by the last mentioned means and steplessly changing said adjusting means to increasingly and uniformly delay switch closure as the temperature of the last mentioned element rises and to increasingly and uniformly accelerate switch closure as that temperature falls.

17. In a heating system control device, heat supply means, a thermal switch controlled by the temperature of the heat supply, means for initiating heat generation as a result of switch closure and having adjusting means, a thermal element exposed to temperatures other than the heat supply means, and electrical means controlled by the last mentioned element and steplessly changing said adjusting means to smoothly and increasingly delay switch closure as the temperature of the last mentioned element rises, and to smoothly and increasingly accelerate switch closure as that temperature falls.

GEORGE D. KINGSLAND.